US010217110B1

(12) United States Patent
Chen et al.

(10) Patent No.: US 10,217,110 B1
(45) Date of Patent: Feb. 26, 2019

(54) SECURITY FEATURES FOR OFFLINE TRANSACTIONS

(71) Applicant: Square, Inc., San Francisco, CA (US)

(72) Inventors: Grace Huey Chen, San Francisco, CA (US); Christopher Lang Mocko, San Francisco, CA (US); Michael Wells White, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 821 days.

(21) Appl. No.: 14/274,481

(22) Filed: May 9, 2014

(51) Int. Cl.
*G06Q 40/00* (2012.01)
*G06Q 20/40* (2012.01)
*G06Q 30/02* (2012.01)
*G06Q 20/20* (2012.01)

(52) U.S. Cl.
CPC ....... *G06Q 20/4016* (2013.01); *G06Q 20/202* (2013.01); *G06Q 30/0268* (2013.01)

(58) Field of Classification Search
CPC ..................................................... G06Q 40/00
USPC ............................................ 705/35, 38, 39, 40
See application file for complete search history.

(56) References Cited

U.S. PATENT DOCUMENTS

2014/0172680 A1\* 6/2014 Prabhu ................. G06Q 40/025
705/38

\* cited by examiner

*Primary Examiner* — Ojo O Oyebisi
(74) *Attorney, Agent, or Firm* — Lee & Hayes, P.C.

(57) ABSTRACT

Techniques and arrangements for providing payment protection to merchants who utilize point-of-sale (POS) devices that are configured to conduct transactions in both online and offline modes. In an offline mode, a POS device of a merchant stores information regarding a payment instrument used in a transaction between the merchant and a customer, for later sending of the information to a payment service for authorization of the payment instrument when the POS device is in the online mode. The described techniques protect the merchant in a situation where a payment instrument used in an offline transaction is later declined, by providing payment to the merchant for at least a portion of the cost associated with the transaction.

26 Claims, 6 Drawing Sheets

SECURITY FEATURES FOR OFFLINE TRANSACTIONS

BACKGROUND

In today's commerce, merchants often utilize an array of different point-of-sale (POS) devices, including mobile POS devices. Merchants may use these mobile POS devices to engage in transactions with customers at different locations. For instance, a taxi driver may use a mobile POS device to charge a passenger for a taxi ride. In another example, a street vendor may use a mobile POS device to charge a customer for an item purchased from the street vendor.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In part because of the mobile nature of POS devices described herein, the POS devices may sometimes lack network connectivity and, hence, one such POS device may be unable to immediately authorize payment for a good or service. For instance, if a taxi passenger pays for a taxi ride with a credit card while a mobile POS device of the taxi driver is operating in an "offline" mode, the POS device may be unable to authorize the credit card until the POS device regains network connectivity. In this example, the taxi driver may bear the risk of the credit card being declined, given that the driver would likely learn that the card has been declined when the passenger has long left the taxi.

Some implementations described herein include techniques and arrangements for providing security features to merchants who utilize point-of-sale (POS) devices that are configured to conduct transactions in an offline mode, the security features protecting the merchant from fraudulent transactions.

To conduct a transaction, a merchant may receive a payment instrument from a customer to pay for a good or service that the customer receives from the merchant. The merchant may then input an identifier associated with the payment instrument into a POS device by, for example, swiping the payment instrument, typing in a number of the payment instrument, or the like. When the POS device is operating in an online mode, the POS device sends information regarding identifier of the payment instrument to a payment service for authorization of the payment instrument. In some instances, the POS device sends this information to the payment instrument substantially contemporaneously with the POS device receiving the identifier of the payment instrument. After a short delay (e.g., one second), the POS device may receive an indication of whether the payment instrument has been approved or declined for an amount of the transaction (i.e., a cost of the good or service). Given the short turnaround between the receiving of the payment instrument and the receiving of the indication regarding whether the payment instrument has been authorized, the online mode affords the merchant the opportunity to request another payment instrument from the customer in the event that the initial payment instrument is declined.

When the POS device operates in the offline mode, however, the POS device locally stores the information regarding the identifier of the payment instrument for later sending to the payment service after the POS device transitions into the online mode. In some instances, the POS device might not transition back into the online mode for many minutes or even hours. For example, if the merchant is currently located somewhere where the POS device lacks network connectivity, then the POS device will not transition into the online mode until the merchant moves to a location at which the POS device will have network connectivity. As such, the merchant will likely not learn whether the payment instrument has been authorized until after the customer has left proximity of the merchant. As such, the merchant may bear the risk of not receiving payment for the provided good or service for an offline transaction.

To avoid this risk, the techniques described herein may provide security features to the merchant to protect the merchant from fraudulent payments made for offline transactions. That is, if a merchant obtains the payment protection, the merchant may receive payment from a provider of the protection if a payment instrument used in an offline transaction is declined.

For instance, a third-party to the transaction between the merchant and the customer (e.g., the payment service), may provide this payment protection to the merchant in exchange for a fee (e.g., a one-time payment, a monthly fee, etc.). In some instances, the payment service, or other entity offering the payment protection, may calculate a fee to charge the merchant based on a risk profile associated with the merchant. This risk profile may be generated on a number of factors, including, for example:

How often the POS device(s) associated with the merchant has previously been in the offline mode (e.g., a number of transactions conducted in the offline mode over a previous amount of time, a percentage of transactions conducted relative to all transactions, an amount of time that the POS device has been in the offline mode, a percentage of time that the POS device has been in the offline mode, etc.);

a decline rate associated with the merchant (e.g., a percentage or number of transactions of the merchant that have been declined, either in the offline mode, the online mode, or generally);

an average or median price of transactions conducted by the merchant or a specific POS device(s) associated with the merchant (e.g., in the offline mode, in the online mode, or generally);

a geographical location associated with the merchant or specific POS device(s) associated with the merchant (e.g., where the merchant conducts transactions, a mailing or billing address associated with the merchant, etc.);

an amount of time typically taken by the merchant to upload information regarding payment instruments received when a POS device of the merchant is operating in the offline mode;

times-of-days or days-of-the-week at which the merchant often engages in transactions;

demographic information associated with customers of the merchant (e.g., income levels, geographical locations, age information, etc.);

a diversity of payment instruments received from customers of the merchant in past transactions (i.e., a "bin diversity");

a reputation score of the merchant at a third-party service (e.g., at an online review service);

a class of goods or services offered by the merchant;

a size of the merchant (e.g., based on yearly sales, a number of employees, a number of locations, etc.); and some or all of the above information for other merchants determined to be similar to the merchant (e.g., with similarity being based on goods/services offered, size, geographical location, reputation, etc.).

As mentioned above, after generating a risk profile for the merchant, the payment service may calculate a fee to charge the merchant for the payment protection based on the risk profile. In some instances, the payment service may also create limits or rules on the payment protection, potentially based on the risk profile. These limits may include, for example:

Limits on an amount of payment provided to a merchant for a declined payment instrument on a per-transaction or per-period basis;

limits on a total number of transactions that the payment service will cover, either for a life of the payment protection or on a per-period basis;

limits to transactions that occur during certain times-of-days or certain days-of-the-week;

limits to transactions for which the merchant provides the authorization request within a certain amount of time, which may be based on a time between a merchant sending the request and the payment service receiving the request (e.g., transactions that were conducted days before the request might not be covered);

limits to transactions that occur in certain geographical locations;

limits to transactions that occur with certain classes of payment instruments (e.g., credit cards or certain classes of credit cards may be covered, stored-value or gift cards might not be covered, expired payment instruments might not be covered, etc.); and limits on transactions made when the POS device is operating in the offline mode based on an operator of the POS device manually transitioning the POS device to the offline mode (e.g., by switching off functionality for obtaining network connectivity or by transitioning an application associated with the POS device to the offline mode).

After generating a risk profile for a merchant, calculating a fee for the payment protection based on the risk profile, and determining limits and other information associated with the payment protection, the payment service may offer the payment protection to the merchant. For instance, upon the merchant registering with the payment service, or upon an already registered merchant receiving an indication that a payment instrument has been declined, the payment service may offer the payment protection to the merchant in exchange for the fee. In response to the merchant accepting the payment protection, the merchant may subsequently be protected against non-payment in offline transactions according to the rules and limits of the protection.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Figure 1:
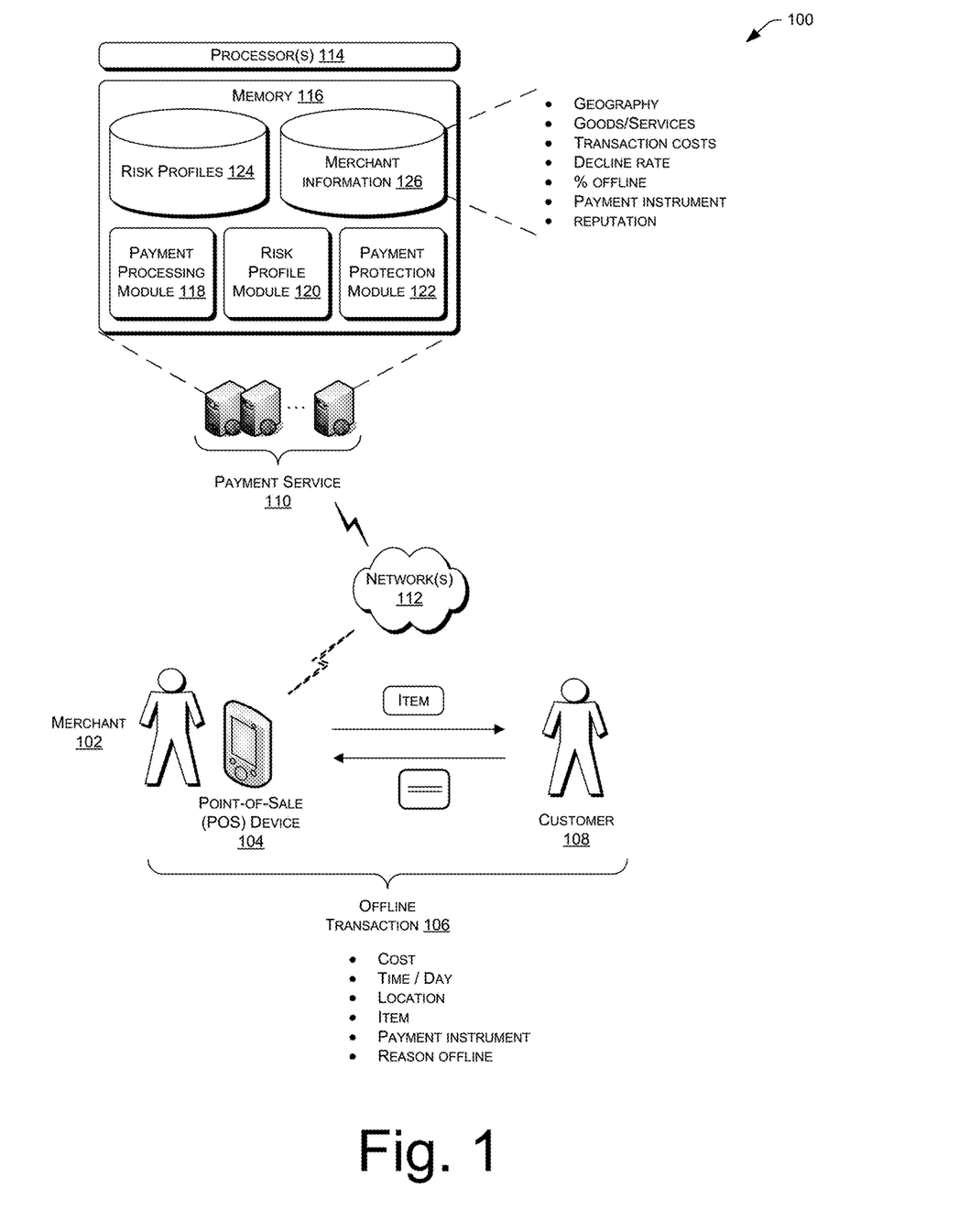
FIG. 1 illustrates an example environment that includes a merchant operating a mobile point-of-sale (POS) device to conduct a transaction with a customer while the POS device is in an offline mode. The environment also includes a payment service that may reimburse the merchant in the event that a payment instrument of the customer given to the merchant as part of the offline transaction is later declined.

FIG. 1 illustrates an example environment 100 that includes a merchant 102 operating a point-of-sale (POS) device 104 to engage, in this example, in an offline transaction 106 with a customer 108. The POS device 104 may comprise any sort of mobile or non-mobile device that includes an instance of a merchant application that executes on the respective device. The merchant application may provide POS functionality to the POS device 104 to enable the merchant 102 (e.g., an owner, employees, etc.) to accept payments from customers, such as the customer 108. In some types of businesses, the POS device 104 may correspond to a store or other place of business of the merchant, and thus, may be a fixed location that typically does not change on a day-to-day basis. In other types of businesses, however, the POS device 104 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104 to process the transaction, such as by inputting (e.g., manually, via a magnetic card reader or an RFID reader, etc.) an identifier associated with the payment instrument. For example, a payment instrument of the customer 108 may include one or more magnetic strips for providing card and customer information when swiped in a card reader. In other examples, other types of payment cards may be used, such as smart cards having a built-in memory chip, a radiofrequency identification tag, or so forth.

During the transaction, the POS device 104 can determine transaction information describing the transaction, such as the identifier of the payment instrument, an amount of payment received from the customer, the item(s) acquired by the customer, a time, place and date of the transaction, and so forth. The POS device 104 can send the transaction information to the payment service, either substantially contemporaneously with the conducting of the transaction (in the case of online transactions) or later when the device 104 is in the online mode (in the case offline transactions).

In the illustrated example of the offline transaction 106, the POS device 104 may store one or more characteristics associated with the transaction (i.e., the transaction information), such as a cost of the transaction, a time of day at which the transaction occurred, a day of the week at which the transaction occurred, a location at which the transaction took place, an item that the customer 108 obtained, a payment instrument used in the transaction, and a reason as to why the device is operating in the offline. The latter characteristic may indicate, for example, whether the POS device 104 lacks network connectivity based on the current location of the device 104 (i.e., network connectivity is unavailable), whether the POS device 104 lacks network connectivity based on the merchant 102 turning or switching off WiFi, whether the POS device 104 been transitioned to the offline mode in response to the merchant 102 requesting this mode on the merchant application executing on the POS device 104, or the like.

After conducting the example illustrated transaction with the customer 108, the POS device 104 may provide the stored information to a payment service 110 over a network 112. The network 112 may represent any one or more wired or wireless networks, such as a WiFi network, a cellular network, or the like.

As illustrated, the payment service 110 may include one or more processors 114 and memory 116, which may store a payment processing module 118, a risk profile module 120, a payment protection module 122, one or more risk profiles 124 corresponding to respective merchants, and merchant information 126, also corresponding to respective merchants. The payment processing module 118 may function to receive the information regarding a transaction from the POS device 104 and attempt to authorize the payment instrument used to conduct the transaction. The payment processing module 118 may then send an indication of whether the payment instrument has been approved or declined back to the POS device 104.

Generally, when a customer and a merchant enter into an electronic payment transaction, the transaction is processed by electronically transferring funds from a financial account associated with the customer to a financial account associated with the merchant. As such, the payment processing module 118 may communicate with one or more computing devices of a card payment network, e.g., MasterCard®, VISA®, over the network 112 to conduct financial transactions electronically. The payment processing module 118 can also communicate with one or more computing devices of one or more banks over the network 112. For example, the payment processing module 118 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

As described above, when the POS device 104 operates in the offline mode, as in the illustrated example, the POS device 104 does not provide the information regarding the offline transaction 106 until the POS device 104 is transitioned back into the online mode. As such, the payment processing module 118 is unable to determine whether the payment instrument of the customer 108 is authorized or not until sometime after consummation of the transaction 106. As such, in the illustrated example the merchant 102 may have previously acquired payment protection, meaning that the payment service or another entity may provide some or all of a payment due to the merchant in the event that a payment instrument used by the customer 108 in the offline transaction 106 is later declined.

In some instances, payment protection offered to a merchant, such as the merchant 102, may be based at least in part on a risk profile associated with the merchant. The risk profile module 120 may generate risk profiles 124 for merchants based on the merchant information 126. As illustrated, this merchant information may include an average decline rate for a particular merchant, a class of goods or services offered by the merchant, an average or median size of costs of previous transactions conducted by the merchant, an number or percentage of transactions conducted by the merchant in the offline mode, classes or a diversity of payment instruments typically received by the merchant, a reputation of the merchant, or the like. After creating a risk profile for the merchant 102, the risk profile module 120 may store this risk profile in the risk profile datastore 124.

The payment protection module 122 may subsequently calculate an amount to charge the merchant 102 for the payment protection, with this amount being based at least in part on the risk profile of the merchant 102. The limits and rules associated with the offered payment protection may also be based, in some instances, on this risk profile. The payment protection module 122 may offer this protection to a computing device associated with the merchant, such as the POS device 104 or another device. If the merchant 102 accepts the offer, then the payment protection module 122 may provide payment to the merchant 102 for offline transactions whose payment instruments are declined.

Figure 2A:
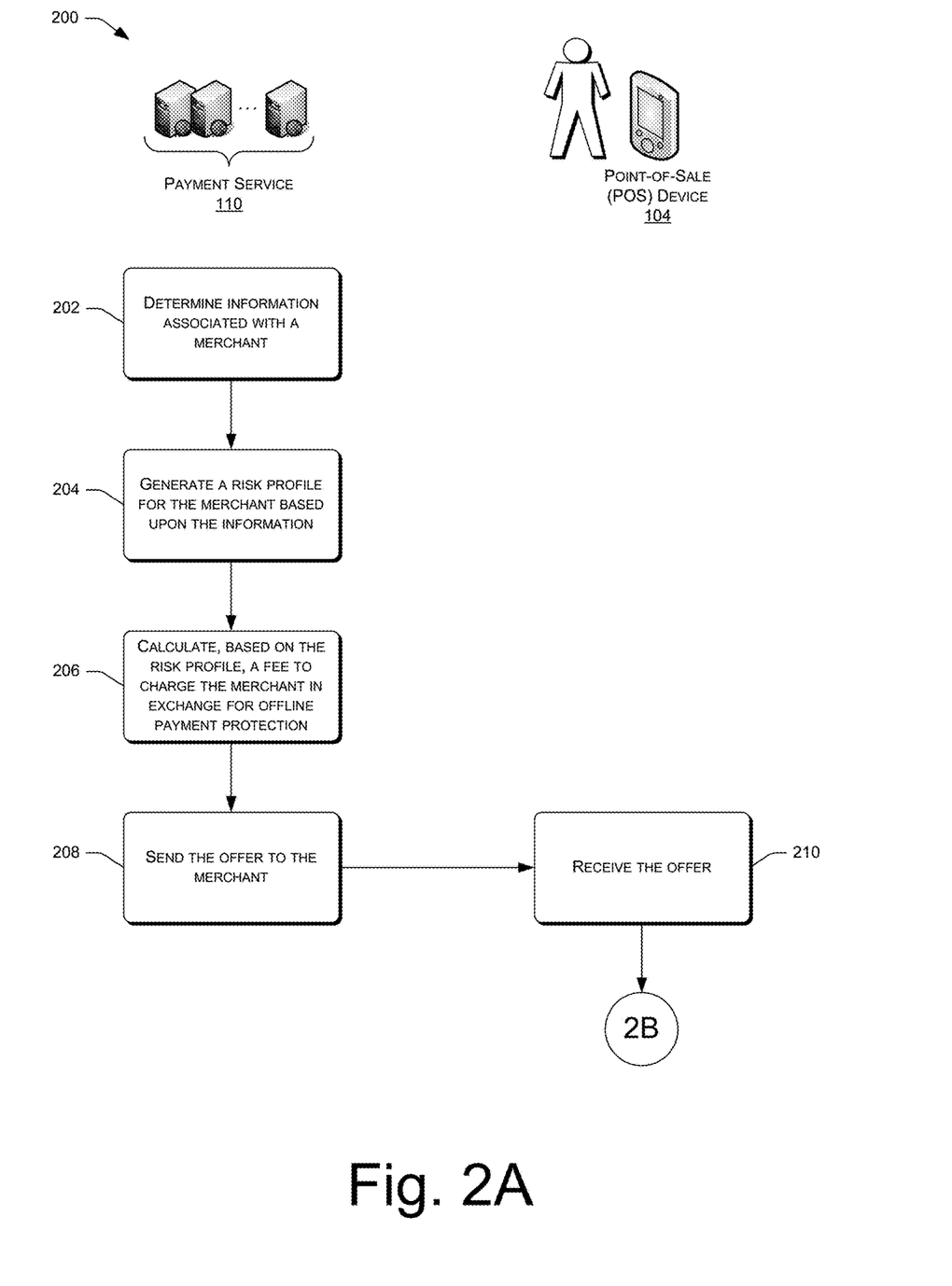
FIGS. 2A-C collectively illustrate a flow diagram of a process that includes a payment service offering security features (e.g., payment protection) to a merchant for offline transactions conducted by the merchant, receiving an acceptance of the offer, and later providing payment to the merchant after a payment instrument of a customer is declined as part of an offline transaction.
Figure 2B:
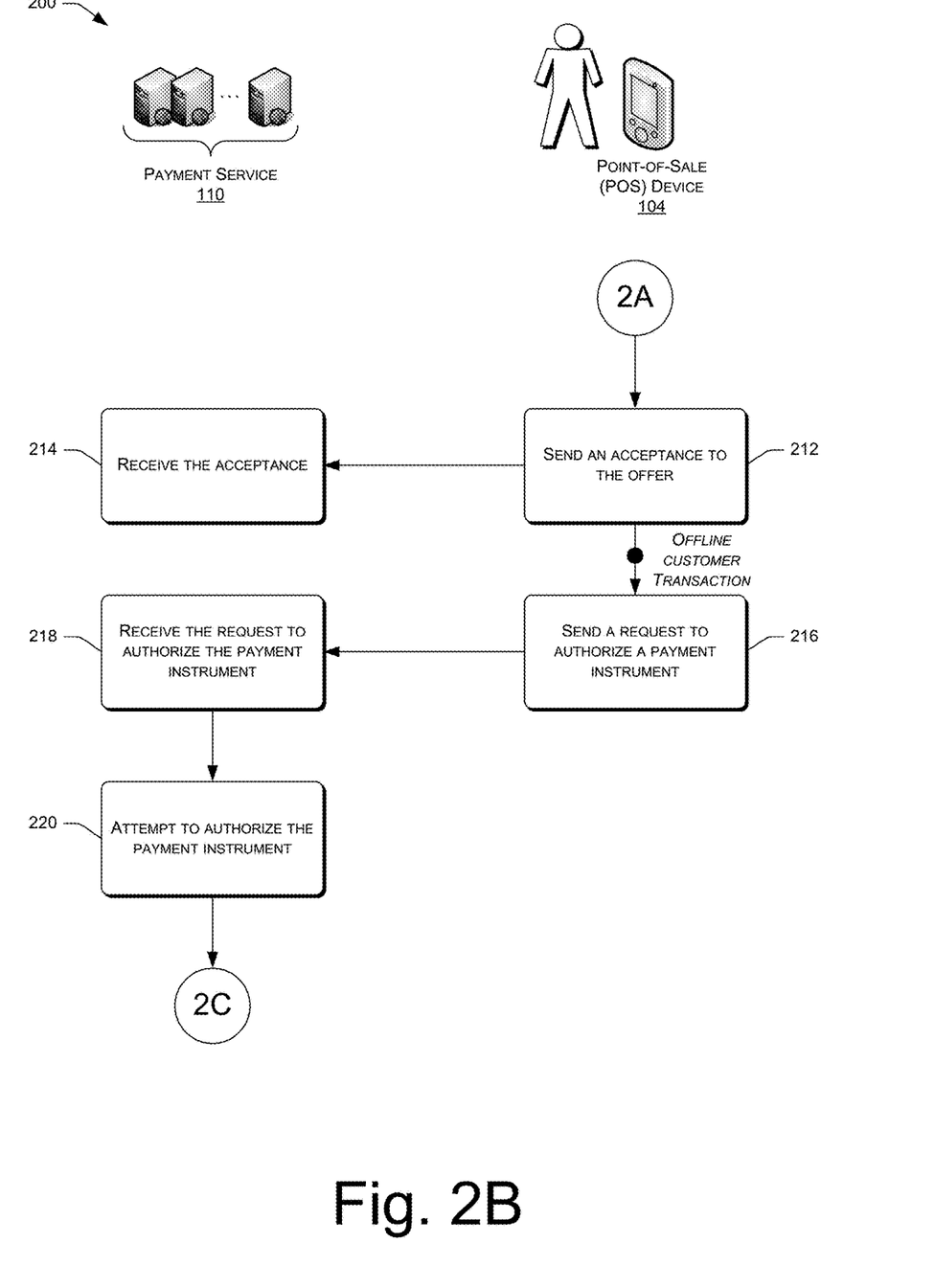
Figure 2C:
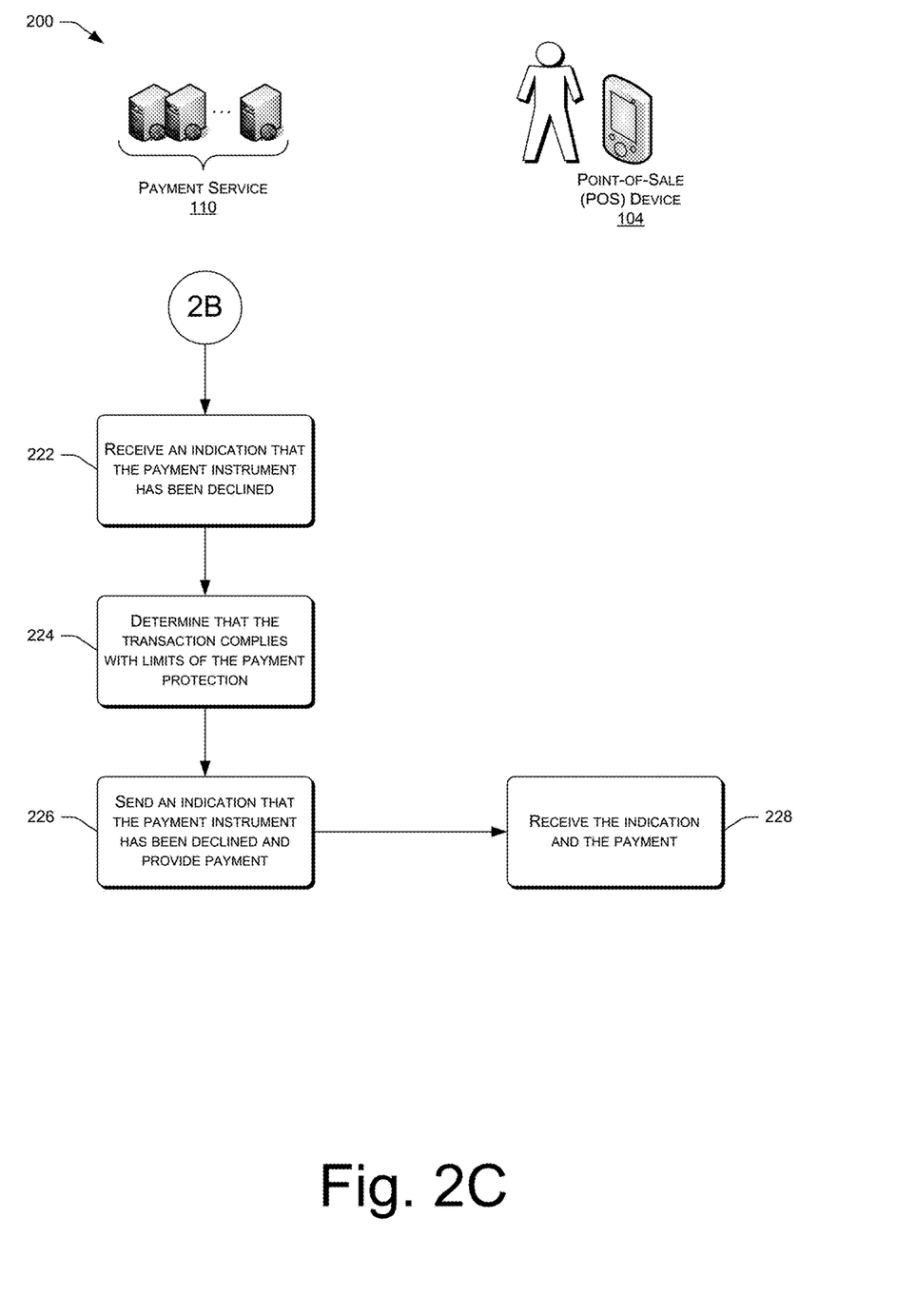

FIGS. 2A-C collectively illustrate a flow diagram of a process 200 that includes a payment service offering security features (e.g., payment protection) to a merchant for offline transactions conducted by the merchant, receiving an acceptance of the offer, and later providing payment to the merchant after a payment instrument of a customer is declined as part of an offline transaction. The process 200 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At 202, the payment service 110 determines information associated with the merchant. This information may be based on transactions previously conducted by the merchant, demographic information associated with the merchant, information associated with the other merchants deemed similar to the merchant, or the like.

At 204, the payment service 110 generates a risk profile for the merchant based at least in part on the information determined at 202. The risk profile may generally indicate, in some instances, a size of a risk that the payment service 110 would be taking if the payment service 110 were to protect the merchant against non-payment in offline transactions. In some instances, a relatively large historical decline rate of the merchant may indicate a greater risk, as may a relatively large amount of historical offline transactions, a relatively large amount of time spent offline, a relatively large average or median cost of items purchased in offline transaction size, or the like.

In some instances, the payment service 110 may detect or determine whether the merchant has previously conducted at least one transaction offline, or whether (based on the risk profile) the merchant is expected to conduct a future transaction offline. If so, then the payment service 110 may proceed to offer security features to the merchant to protect against fraudulent offline payments.

At 206, the payment service 110 calculates, based on the determining from immediately above and based on the risk profile, a fee to charge the merchant in exchange for the security features to protect against fraudulent payments, such as the payment protection. In general, a higher a risk associated with a merchant, a higher a fee will be for protecting a merchant against non-payment. In addition, the payment service 110 may determine limits and rules associated with a proposed payment protection plan for a particular merchant based upon the risk profile.

At 208, the payment service 110 sends an offer for the payment protection in exchange for the fee to a computing device associated with the merchant, such as the POS device 104 associated with the merchant 102.

At 210, in the illustrated example, the POS device 104 receives the offer from the payment service. FIG. 2B continues the illustration of the process 200.

At 212, the POS device 104 of the merchant sends an acceptance of the offer to the payment service. For instance, a POS application executing on the device 104 may surface the offer and may provide the merchant 102 with the opportunity to accept the payment protection in exchange for the calculated fee.

At 214, the payment service 110 receives the acceptance. At this point, the payment service 110 may charge an account associated with the merchant the calculated fee and may store an indication, in the merchant information 126, that the merchant is now protected against non-payment for some or all future offline transactions.

The right side of the diagram, beneath the operation 212, indicates that after sending the acceptance of the offer the POS device 104 engages in an offline transaction with a customer. At 216, as part of this offline transaction, the POS device 104 sends a request to the payment service 110 to authorize a payment instrument used by the customer in the transaction.

At 218, the payment service 110 receives the request to authorize the payment instrument and, at 220, attempts to authorize the payment instrument. This may include communicating with computing devices associated with the payment instrument, such as computing devices of a card payment network, an issuing bank, or the like. FIG. 2C continues the illustration of the process 200.

At 220, in the illustrated example the payment service 110 receives an indication that the payment instrument has been declined. For example, a computing device of a card payment network an issuing bank may provide an indication that the payment instrument is not authorized for the amount of the transaction.

At 222, the payment service 110 determines that the transaction complies with limits of the payment protection obtained by the merchant. For instance, the payment service 110 may compare certain information associated with the transaction to certain limits on the payment protection of the merchant 102. For instance, the payment service 110 may verify that the transaction occurred within a prescribed time-of-day range that is covered by the payment protection plan, on a prescribed day-of-the-week that is covered by the payment protection plan, at a prescribed location that is covered by the payment protection plan, using a prescribed payment instrument that is covered by the payment protection plan (e.g., not a stored-value or gift card), or the like.

At 224, the payment service 110 sends an indication, to the POS device 104 or another computing device associated with the merchant, that the payment instrument has been declined. Nevertheless, as part of the payment protection obtained by the merchant, the payment service 110 may nevertheless provide payment to the merchant 102 for the transaction. An amount of the payment may be based on a cost of the transaction, potentially along with one or more limits of the payment protection. In some instances, the payment service provides an amount equal to or based on a percentage of a cost of the transaction. At 228, the POS device 104 or another computing device of the merchant 102 receives an indication that the payment instrument has been declined and also receives the payment.

Figure 3:
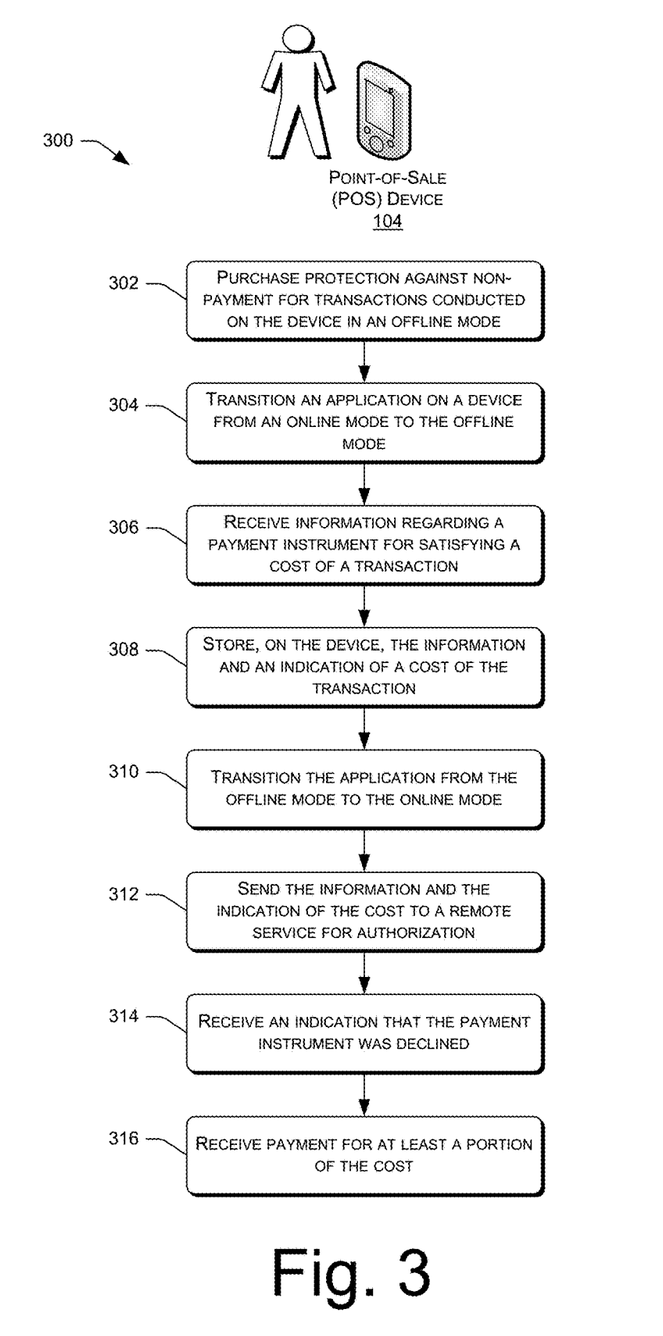
FIG. 3 illustrates a flow diagram of a process that includes a merchant obtaining security features (e.g., payment protection) and receiving payment after a payment instrument used in an offline transaction is declined.

FIG. 3 illustrates a flow diagram of a process 300 that includes a merchant obtaining payment protection and receiving payment after a payment instrument used in an offline transaction is later declined. In some instances, some or all of the process 300 may be performed by a POS device or other computing device associated with a merchant, such as the illustrated merchant 102.

At 302, the merchant purchases protection against non-payment for transactions conducted when the POS device 104 is in the offline mode. As described above, this protection may be subject to certain limits.

At 304, the POS device transitions a POS application on the device from an online mode to an offline mode. As described above, in an online mode, transaction information associated with a transaction may be uploaded to a payment service substantially contemporaneously with receiving a payment instrument for the transaction, while the device stores this information for later sending when in the offline mode. The POS device 104 may transition the application in response to a request from an operator of the device, in response to the device losing network connectivity without user input, or for other reasons.

At 306, the POS device receives information regarding a payment instrument as part of a transaction between the illustrated merchant and a customer. The POS device 104 may receive this information via a magnetic card reader, a RFID card reader, or the like.

At 308, the POS device 104 stores, locally on the device, the information regarding the payment instrument and an indication of a cost of the transaction. In addition, the POS device 104 may store additional information regarding the transaction, such as geographical location at which the transaction occurred, a time at which the transaction occurred, and the like.

At 310, the POS device transitions from the offline mode to the online mode. As above, this transition may occur in response to a request from the operator of the device, in response to the device gaining network connectivity without user input, or for other reasons.

At 312, the POS device now sends the information regarding the payment instrument the additional information (e.g., the indication of the cost, the time at which the transaction occurred, etc.) to the payment service. The POS device may also send additional information, such as a time of sending this information, a location from which the POS device 104 is sending the information, or the like.

At 314, the POS device 104 or another device of the merchant 102 may receive an indication that the payment instrument has been declined. At 316, however, given the merchant's acquisition of the payment protection, the merchant may receive payment for at least a portion of the cost of the transaction.

Figure 4:
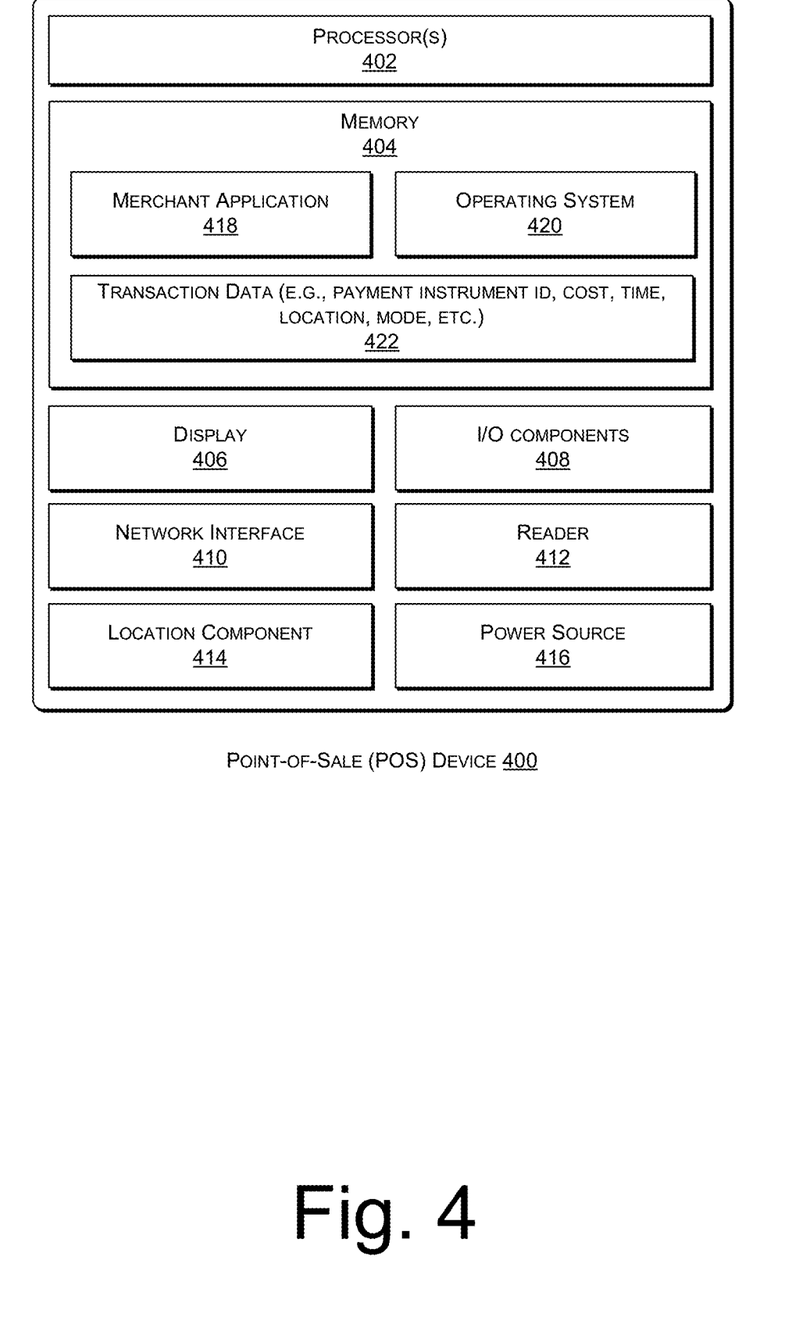
FIG. 4 illustrates select components of a POS device that a merchant described herein may utilize.

FIG. 4 illustrates select example components of an example POS device 400 according to some implementations. The POS device 400 may be any suitable type of computing device, e.g., mobile, semi-mobile, semi-stationary, or stationary. Some examples of the POS device 400 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 400 includes at least one processor 402, memory 404, a display 406, one or more input/output (I/O) components 408, one or more network interfaces 410, at least one card reader 412, at least one location component 414, and at least one power source 416. Each processor 402 may itself comprise one or more processors or processing cores. For example, the processor 402 can be implemented as one or more microprocessors, microcomputers, microcontrollers, digital signal processors, central processing units, state machines, logic circuitries, and/or any devices that manipulate signals based on operational instructions. In some cases, the processor 402 may be one or more hardware processors and/or logic circuits of any suitable type specifically programmed or configured to execute the algorithms and processes described herein. The processor 402 can be configured to fetch and execute computer-readable processor-executable instructions stored in the memory 404.

Depending on the configuration of the POS device 400, the memory 404 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 404 may include, but is not limited to, RAM, ROM, EEPROM, flash memory, solid-state storage, magnetic disk storage, optical storage, and/or other computer-readable media technology. Further, in some cases, the POS device 400 may access external storage, such as RAID storage systems, storage arrays, network attached storage, storage area networks, cloud storage, or any other medium that can be used to store information and that can be accessed by the processor 402 directly or through another computing device or network. Accordingly, the memory 404 may be computer storage media able to store instructions, modules or components that may be executed by the processor 402. Further, when mentioned, non-transitory computer-readable media exclude media such as energy, carrier signals, electromagnetic waves, and signals per se.

The memory 404 may be used to store and maintain any number of functional components that are executable by the processor 402. In some implementations, these functional components comprise instructions or programs that are executable by the processor 402 and that, when executed, implement operational logic for performing the actions and services attributed above to the POS device 400. Functional components of the POS device 400 stored in the memory 404 may include a merchant application 418, discussed above. The merchant application 418 may present an interface on the POS device 400 to enable the merchant to conduct transactions, receive payments, and so forth, as well as communicating with the payment service 110 for processing payments and sending transaction information. Further, the merchant application 418 may present an interface to enable the merchant to manage the merchant's account, and the like. Additional functional components may include an operating system 420 for controlling and managing various functions of the POS device 400 and for enabling basic user interactions with the POS device 400. The memory 404 may also store transaction information, as transaction data 422, that is received based on the merchant associated with the POS device 400 engaging in various transactions with customer, such as the example customer 108 from FIG. 1.

In addition, the memory 404 may also store data, data structures and the like, that are used by the functional components. For example, this data may include item information that includes information about the items offered by the merchant, which may include images of the items, descriptions of the items, prices of the items, and so forth. Depending on the type of the POS device 400, the memory 404 may also optionally include other functional components and data, which may include programs, drivers, etc., and the data used or generated by the functional components. Further, the POS device 400 may include many other logical, programmatic and physical components, of which those described are merely examples that are related to the discussion herein.

The network interface(s) 410 may include one or more interfaces and hardware components for enabling communication with various other devices over the network or directly. For example, network interface(s) 410 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 4 further illustrates that the POS device 400 may include the display 406 mentioned above. Depending on the type of computing device used as the POS device 400, the display 406 may employ any suitable display technology. For example, the display 406 may be a liquid crystal display, a plasma display, a light emitting diode display, an OLED (organic light-emitting diode) display, an electronic paper display, or any other suitable type of display able to present digital content thereon. In some examples, the display 406 may have a touch sensor associated with the display 406 to provide a touchscreen display configured to receive touch inputs for enabling interaction with a graphic interface presented on the display 406. Accordingly, implementations herein are not limited to any particular display technology. Alternatively, in some examples, the POS device 400 may not include the display 406, and information may be present by other means, such as aurally.

The I/O components 408, meanwhile, may include speakers, a microphone, a camera, and various user controls (e.g., buttons, a joystick, a keyboard, a keypad, etc.), a haptic output device, and so forth.

In addition, the POS device 400 may include or may be connectable to a payment instrument reader 412. In some examples, the reader 412 may plug in to a port in the merchant device, such as a microphone/headphone port, a data port, or other suitable port. In other instances, the reader 412 is integral with the entire POS device 400. The reader may include a read head for reading a magnetic strip of a payment card, and further may include encryption technology for encrypting the information read from the magnetic strip. Alternatively, numerous other types of card readers may be employed with the POS devices 400 herein, depending on the type and configuration of a particular POS device 400.

The location component 414 may include a GPS device able to indicate location information, or the location component 414 may comprise another other location-based sensor. The POS device 400 may also include one or more additional sensors (not shown), such as an accelerometer, gyroscope, compass, proximity sensor, and the like. Additionally, the POS device 400 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system disposed on a network between a payment-fulfillment service and point-of-sale (POS) devices associated with merchants, the system corresponding to a payment-processing service to process transactions on behalf of the merchants, the system comprising:
   one or more network-based serving devices comprising:
      one or more processors; and
      one or more computer-readable media storing instructions executable by the one or more processors, wherein the instructions program the one or more processors to:
         receive, over the network, first transaction data for first transactions from a mobile POS device associated with a merchant of the merchants, the mobile POS device operating in an online mode corresponding to the mobile POS device having network connectivity and executing an instance of a merchant application configuring the mobile POS device as a POS terminal;
         determine, based at least in part on the first transaction data, information associated with the merchant, the information comprising at least one of:
            a number of the first transactions previously conducted while the mobile POS device was operating in an offline mode corresponding to the mobile POS device lacking network connectivity such that the mobile POS device was unable to send payment information associated with the number of the first transactions until the mobile POS device gained network connectivity;
            a decline rate associated with the first transactions;
            at least one of an average price or a median price of the first transactions; or
            a geographical location of the mobile POS device at which a least a portion of the first transactions were conducted;
         generate, based at least in part on the information, a profile for the merchant;
         detect, based at least in part on at least one of the profile or the geographical location of the mobile POS device, that the merchant is expected to conduct a second transaction while the mobile POS device is operating in the offline mode;
         based at least in part on detecting that the merchant is expected to conduct the second transaction while the mobile POS device is operating in the offline mode:
            calculate, based at least in part on the profile for the merchant, a fee to charge the merchant in exchange for providing, to the merchant, a monetary amount in the event of non-payment associated with the second transaction conducted while the mobile POS device is operating in the offline mode;
            determine, based at least in part on the profile, a limit associated with providing, to the merchant, the monetary amount in the event of non-payment; and
            send, to the mobile POS device while the mobile POS device is operating in the online mode, (i) an offer to provide, in exchange for the fee, the monetary amount in the event of non-payment and (ii) a request for second transaction data associated with the second transaction dynamically determined based on the limit associated with providing the monetary amount in the event of non-payment;
         receive, from the mobile POS device while the mobile POS device is operating in the online mode, data representing an acceptance of the offer;
         receive, from the mobile POS device while the mobile POS device is operating in the online mode, third transaction data associated with the second transaction conducted while the mobile POS device was operating in the offline mode, the third transaction data including (i) a cost of the second transaction and (ii) the second transaction data;
         determine that the second transaction is unauthorized;
         determine, based at least in part on the third transaction data, that the second transaction complies with the limit associated with providing the monetary amount in the event of non-payment; and
send, to the mobile POS device and based at least in part on the acceptance of the offer, payment for at least a portion of the cost.

2. A system as recited in claim 1, wherein the merchant comprises a first merchant, and the instructions further program the one or more processors to:
   determine a second merchant of the merchants that offers goods or services deemed similar to goods or services offered by the first merchant;
   determine a decline rate associated with the second merchant; and
   generate the profile further based at least in part on the decline rate associated with the second merchant.

3. A system as recited in claim 1, wherein the instructions further program the one or more processors to:
   determine an amount of time that the mobile POS device was operating in the offline mode prior to sending the offer; and
   generate the profile further based at least in part on the amount of time.

4. A system as recited in claim 1, wherein the limit restricts providing, to the merchant, the monetary amount in the event of non-payment to at least one of:
   the one or more second transactions made during certain times-of-day;
   the one or more second transactions made on certain days of the week;
   the one or more second transactions made using certain payment instruments;
   the one or more second transactions made at certain geographical locations; or
   the one or more second transactions made when the mobile POS was operating in the offline mode for reasons other than an operator of the mobile POS device switching off functionality for obtaining network connectivity.

5. One or more computer-readable media storing computer-executable instructions that, when executed, cause one or more processors to perform acts comprising:
   determining, based at least in part on first transaction data received over a network from a point-of-sale (POS) device of a merchant, a characteristic of the merchant that utilizes the POS device, the POS device configured to operate in an online mode and in an offline mode, the first transaction data associated with first transactions that have been conducted in the offline mode that have been stored locally on the POS device until the POS device transitioned to the online mode at least partially in response to gaining network connectivity;
   generating, by a profile module of the one or more processors, a profile for the merchant based at least in part on the characteristic;
   determining, based at least in part on the profile and by a payment protection module of the one or more processors, a fee to charge the merchant for providing, to the merchant, a monetary amount in the event of non-payment for second transactions conducted while the POS device is operating in the offline mode;
   determining, based at least in part on the profile and by the payment protection module of the one or more processors, at least one limit associated with providing the monetary amount in the event of non-payment for the second transactions conducted while the POS device is operating in the offline mode;
   detecting, based at least in part on the profile, that the merchant is expected to conduct a transaction while the POS device is operating in the offline mode;
   responsive to detecting that the merchant is expected to conduct the transaction while the POS device is operating in the offline mode, sending, to the POS device or another computing device of the merchant, an offer for providing the monetary amount in the event of non-payment in exchange for the fee and a request for second transaction data associated with the at least one limit;
   receiving, over the network and from the POS device in the online mode, an acceptance of the offer;
   receiving, over the network and from the POS device in the online mode, third transaction data associated with the transaction conducted while the POS device was operating in the offline mode, the third transaction data including at least (i) information associated with a payment instrument, (ii) a cost of the transaction, and (iii) the second transaction data;
   determining that the payment instrument is declined; and
   sending, to the POS device and based at least in part on the acceptance of the offer, an indication that the payment instrument is declined and the monetary amount comprising at least a portion of the cost of the transaction.

6. One or more computer-readable media as recited in claim 5, wherein the characteristic comprises a diversity of payment instruments used by customers in previous transactions with the merchant.

7. One or more computer-readable media as recited in claim 5, wherein the characteristic comprises at least one of:
   a decline rate associated with the merchant;
   an average cost of previous transactions conducted by the merchant; or
   a median cost of previous transactions conducted by the merchant.

8. One or more computer-readable media as recited in claim 5, wherein the characteristic is based at least in part on an amount of time that the POS device operated in the offline mode during a previous time period.

9. One or more computer-readable media as recited in claim 5, wherein the characteristic is based at least in part on an amount of time between when a previously conducted transaction occurred on the POS device and when the POS device sent information regarding the previously conducted transaction to a payment-processing service for authorization of the payment instrument associated with the previously conducted transaction.

10. One or more computer-readable media as recited in claim 5, wherein the characteristic is based at least in part on a reputation score of the merchant maintained by a third-party service.

11. One or more computer-readable media as recited in claim 5, wherein the monetary amount ensures that the merchant will receive payment for a least the portion of the cost associated with the transaction when the merchant processes the payment instrument for the transaction when the POS device is operating in the offline mode and the payment instrument is later declined for the cost of the transaction, subject to the at least one limit associated with providing the monetary amount in the event of non-payment.

12. One or more computer-readable media as recited in claim 11, wherein the at least one limit restricts providing the monetary amount in the event of non-payment to at least one of a certain number of the second transactions or to the second transactions with total costs that exceed a threshold cost.

13. One or more computer-readable media as recited in claim 11, wherein the at least one limit restricts providing the monetary amount in the event of non-payment to at least one of the second transactions that occur during certain times of day or the second transactions that occur on certain days of the week.

14. One or more computer-readable media as recited in claim 11, wherein the at least one limit restricts providing the monetary amount in the event of non-payment to the second transactions that occur within a certain geographical area.

15. One or more computer-readable media as recited in claim 11, wherein the at least one limit restricts the payment protection to the second transactions that occur when the POS device is in the offline mode without user input at the POS device causing the POS device to enter the offline mode.

16. A method implemented at least in part by a computing device, the method comprising:
    transitioning an application operating on the computing device from an online mode to an offline mode, wherein the online mode corresponds to the computing device having network connectivity and the offline mode corresponds to the computing device lacking network connectivity, wherein:
        the application sends information regarding payment instruments over a network to a network-based computing device managed by a payment-processing service for authorization when the application is operating in the online mode, the payment-processing service disposed on the network between a payment-fulfillment service and computing devices associated with merchants;
        the application stores the information regarding the payment instruments locally and refrains from sending the information to the network-based computing device managed by the payment-processing service when the application is operating in the offline mode until the application transitions to the online mode; and
    responsive to detecting that the computing device is expected to conduct a transaction while the application is in the offline mode, the application surfaces an offer, from the payment-processing service, to provide a monetary amount in the event of non-payment for at least the transaction while the application is operating in the offline mode, the offer being associated with at least one limit and determined based at least in part on a profile associated with a merchant of the merchants;
    receiving, while the application is in the offline mode, information regarding a particular payment instrument for satisfying a cost of the transaction;
    storing, on the computing device, at least a portion of the information regarding the particular payment instrument, at least the portion of the information including (i) an indication of the cost of the transaction and (ii) additional information associated with the at least one limit;
    transitioning, at least partially in response to the computing device gaining network connectivity, the application from the offline mode to the online mode;
    sending, over the network and to the network-based computing device managed by the payment-processing service, at least the portion of the information regarding the particular payment instrument for authorization;
    receiving, over the network and from the payment-processing service, an indication that the particular payment instrument was declined; and
    receiving, over the network and from the payment-processing service, payment for at least a portion of the cost of the transaction.

17. A method as recited in claim 16, further comprising, prior to receiving the payment for at least the portion of the cost of the transaction, facilitating a purchase for providing the monetary amount in the event of non-payment for transactions made on the computing device when the application is operating in the offline mode.

18. A method as recited in claim 16, wherein the payment for at least the portion of the cost of the transaction is received at least partly in response to determining, based at least in part on the additional information, that the transaction satisfies the at least one limit.

19. A method as recited in claim 16, wherein the at least one limit includes restricting providing the monetary amount in the event of non-payment to transactions that occur within an authorized geographical location, and the method further comprises:
    prior to receiving the payment for at least the portion of the cost of the transaction, sending an indication of a location of the computing device at a time when the transaction was conducted, the indication of the location determined by a Global Positioning System (GPS) device associated with the computing device; and
    receiving the payment based at least in part on the location being within the authorized geographical location.

20. A method as recited in claim 16, wherein the at least one limit includes restricting providing the monetary amount in the event of non-payment to at least one of transactions that occur during certain times of day or transactions that occur on certain days of a week, and the method further comprises:
    prior to receiving the payment for the cost of the transaction, sending an indication of a time of day or a day of the week when the transaction was conducted on the computing device; and
    receiving the payment based at least in part on the time of day or the day of the week.

21. A method as recited in claim 16, wherein the at least one limit includes restricting providing the monetary amount in the event of non-payment to transactions that occur when the computing device is in the online mode without input from an operator at the computing device causing the computing device to transition to the offline mode, and the method further comprises:
    prior to receiving the payment for at least the portion of the cost of the transaction, sending an indication of whether the operator of the computing device transitioned the application from the online mode to the offline mode; and
    receiving the payment based at least in part on whether the operator of the computing device transitioned the application from the online mode to the offline mode.

22. A method as recited in claim 16, wherein the at least one limit includes restricting providing the monetary amount in the event of non-payment to transactions that occur when the application is in the online mode without input from an operator at the computing device causing the computing device to transition to the offline mode, and the method further comprises:

prior to receiving the payment for at least the portion of the cost of the transaction, sending an indication of whether the application transitioned from the online mode to the offline mode in response to the computing device losing network connectivity without input from the operator of the computing device at the computing device; and receiving the payment based at least in part on the indication of whether the application transitioned from the online mode to the offline mode in response to the computing device losing network connectivity without input from the operator of the computing device at the computing device.

23. A system as recited in claim 1, further comprising an application stored on the mobile POS device associated with the merchant, wherein the application is configured to:

determine that the mobile POS device is operating in the online mode;

receive information regarding a payment instrument for satisfying the cost of the transaction; and send the information regarding the payment instrument and the cost of the transaction to the one or more network-based serving devices for authorization of the transaction.

24. A system as recited in claim 1, wherein the limits include restricting providing the monetary amount in the event of non-payment to the one or more second transactions that occur within an authorized geographical location, and the system further comprises an application stored on the mobile POS device, wherein the application is configured to:

determine that the mobile POS device is operating in the offline mode;

receive information regarding a payment instrument for satisfying the cost of the transaction;

determine, by a Global Positioning System (GPS) device associated with the mobile POS device, a geographical location of the mobile POS device at a time of the transaction;

store, on the mobile POS device, the information regarding the payment instrument, the geographical location, and the cost of the transaction;

determine that the mobile POS device transitions to the online mode; and send, over the network, the information regarding the payment instrument, the geographical location, and the cost of the transaction to the one or more network-based serving devices for authorization of the transaction based at least in part on the mobile POS device transitioning to the online mode.

25. A system as recited in claim 1, wherein the instructions further program the one or more processors to:

determine a reason why the mobile POS device was in the offline mode; and determine that the transaction complies with the limits of providing the monetary amount in the event of non-payment based at least in part on the reason.

26. One or more computer-readable media as recited in claim 5, wherein the at least one limit includes restricting providing the monetary amount in the event of non-payment to the second transactions that occur within an authorized geographical location, and the acts further comprise:

determining, based at least in part on location information associated with the third transaction data, a geographical location of the POS device at a time of the transaction, the location information determined by a Global Positioning System (GPS) device associated with the POS device;

determining that the transaction satisfies the at least one limit based at least in part on the geographical location being within the authorized geographical location; and determining an amount of the payment based at least in part on the cost and determining that the transaction satisfies the at least one limit.

* * * * *